July 14, 1970  E. A. HAWK, SR  3,520,447
CONTROL FOR POWDER FEED OR SPRAY TORCH
Original Filed April 18, 1966
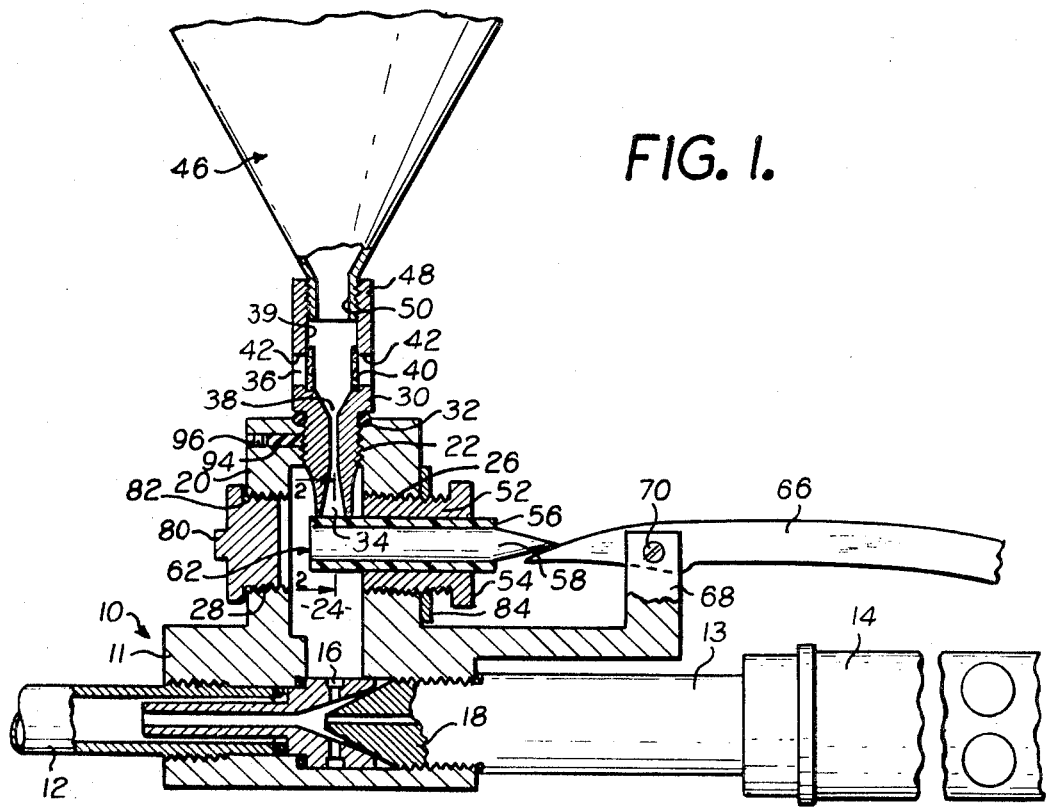
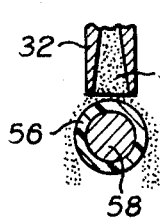
FIG. 4.
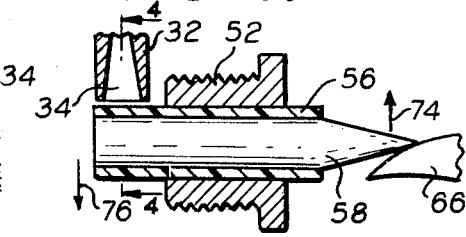
FIG. 3.
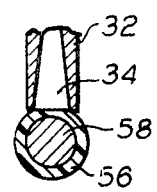
FIG. 2.
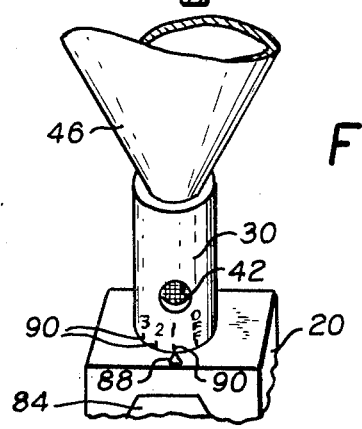
FIG. 5.
INVENTOR
Elwin A. Hawk Sr.
BY
ATTORNEYS.

United States Patent Office 3,520,447
Patented July 14, 1970

3,520,447
CONTROL FOR POWDER FEED OR SPRAY TORCH
Elwin A. Hawk, Sr., East Rochester, Ohio, assignor to Coast Metals, Inc., Little Ferry, N.J., a corporation of Delaware
Original application Apr. 18, 1966, Ser. No. 543,264, now Patent No. 3,396,746, dated Aug. 13, 1968. Divided and this application June 18, 1968, Ser. No. 737,943
Int. Cl. B67d 5/22
U.S. Cl. 222—46                   12 Claims

ABSTRACT OF THE DISCLOSURE

This specification discloses an adjustment for regulating the rate of powder feed into a torch from which powder is sprayed through the torch flame into contact with a workpiece. Powder flows from a hopper into the gas stream in the torch, and a valve under the hopper outlet shuts off the flow when the valve is in closed position. The hopper has threads for screwing it up and down so that it is closer to or further from the valve when the valve is in normally closed position. A graduated scale on the hopper moves past an indicator mark to designate the feed setting.

RELATED PATENT APPLICATION

This application is a division of application Ser. No. 543,264, filed Apr. 18, 1966, now Pat. No. 3,396,746 of Aug. 13, 1968.

BACKGROUND AND SUMMARY OF THE INVENTION

Powder spray torches have a hopper on the torch itself, or a powder container at a fixed location connected with the torch by a flexible hose. A valve for controlling the powder flow is operated by a handle located in position to be actuated by the same hand that holds the torch and that manipulates the torch back and forth across a workpiece.

This invention provides means for supplying powder to a torch with provision for adjusting the feed to provide a controlled supply which can be independent of the powder flow control valve and which is adjustable by graduated means that indicate the rate of powder feed. Thus the invention makes possible the provision of a dual control for a powder feed, either by a valve which must be held in open position to continue the feeding of the powder or an adjustable device which can be set according to a scale to supply continuous feed independently of the other control for use with jobs where the torch is used over a long period with a powder supply that should be maintained uniform.

The invention can also be used to change the rate of powder flow corresponding to any given position of the valve-operating handle or other valve actuating means.

In the preferred construction, the hopper that supplies powder to the gas stream in the torch has a discharge end that screws into the torch. By rotating the hopper, on its threads, the hopper is raised or lowered with respect to the valve so as to open up or change a clearance between the discharge end of the hopper and the valve to obtain powder flow even though the valve is in its normally closed position.

By having a scale and numbers on the hopper adjacent to a surface of the torch into which the hopper screws, the movement of this scale past an indicator pointer on the torch will indicate the corresponding clearance of the hopper discharge from the valve and the resulting rate of powder flow.

Other objects, features and advantages of the invention will appear or be pointed out as the description proceeds.

In the drawing, forming a part hereof, in which like reference characters indicate corresponding parts in all the views:

FIG. 1 is a diagrammatic sectional view of a torch having powder feed control means made in accordance with this invention;

FIG. 2 is a sectional view on the line 2—2 of FIG. 1;

FIG. 3 is an enlarged fragmentary view illustrating the operation of the valve shown in FIGS. 1 and 2;

FIG. 4 is a sectional view on the line 4—4 of FIG. 3; and

FIG. 5 is a fragmentary perspective view of a portion of the structure shown in FIG. 1 and illustrating the control for regulating powder flow independently of the manually operated valve.

FIG. 1 shows a torch 10 having a body 11 with a tip 12 screwed into one end of the body. A mixer 13 is screwed into the other end of the body 11 and there is a torch handle 14 attached to the mixer 13.

Within the body 11 there is a powder passage 16 leading to an aspirator 18 through which gases flow from the mixer 13 to the tip 12.

The body 11 includes a valve housing 20 which is preferably of one-piece construction with the rest of the body 11. This valve housing 20 has a threaded top opening 22 which provides an upper pasasge opening into the valve housing 20 and which is preferably in substantial alignment with the lower powder passage 16. The valve housing 20 encloses a chamber 24. There is a threaded side opening 26 in one side of the housing 20 and a larger side opening 28 in the opposite side of the housing 20 in substantial alignment with the opening 26.

A fitting 30 screws into the top opening 22 and seats against an O-ring or other gasket 32. This fitting 30 has a discharge outlet 34 at its lower end and the discharge outlet preferably tapers to an expanded cross section at its outlet end to prevent any packing of the powder in the outlet. There is a metering passage 38 through which powder is supplied to the discharge outlet; and a counterbore 39 in the upper part of the fitting 30 has sloping walls where it merges with the metering passage 38 to provide a fair form passage for the powder.

There is a shoulder 40 in the counterbore 39 for supporting a wire gauze screen which covers angularly spaced openings 42 in the side wall of the fitting 30.

A powder hopper 46 has a threaded neck 48 which screws into threads 50 at the upper end of the counterbore 38.

A bushing 42 threads into the side opening 26 of the valve housing 20. This bushing 52 has a hexagonal flange 54 for receiving a wrench. A sleeve 56 fits snugly within the bushing 52, and there is a shaft 58 which fills the interior of the sleeve 56 and which extends somewhat beyond the outer end of the sleeve, as illustrated. The sleeve 56 is resilient and may be made of rubber or plastic having deformation characteristics similar to rubber. The shaft 58 is preferably made of metal and is rigid.

The sleeve 56 and shaft 58 constitute a valve element which is indicated generally by the reference character 62. The valve element 62 is held against longitudinal displacement in the bushing 52 by friction, since the sleeve 56 is a snug fit in the bushing and the shaft 58 is a similarly snug fit in the sleeve. If desired, the parts can be dimensioned so that the sleeve 56 is actually under substantial compression when the valve element 62 is inserted in the bushing 52. In any event, the sleeve 56 is under some compression as a result of the snug fit.

The bushing 52 is screwed into the side opening 26 until the end of the valve element 62 reaches just beyond the discharge outlet 34 at the lower end of the fitting 30 so that the valve element provides an interference in the path of the powder flow. When the fitting 30 is screwed down against the O-ring 32, the end of the discharge outlet 34 is in firm contact with the valve element 62, as shown in FIG. 2, and this prevents the escape of powder from the discharge outlet 34. In other words, the valve element 62 is in closed position.

A handle 66 is pivotally connected to a bracket 68 by a fulcrum pin 70. This bracket 68 is integral with the torch body 11 and is shown as being of one-piece construction with the torch body. One end of the handle 66 extends under the outer end of the shaft 58. The handle 66 is rocked clockwise by pressing down on the portion of the handle 66 which extends over the torch handle 14. This clockwise movement of the handle 66 pushes the outer end of the shaft 58 upward, as indicated by the arrow 74 in FIG. 3.

Upward movement of the outer end of the shaft 58 compresses the portion of the sleeve 56 which is located between the bushing 52 and the top of the shaft 58. The compression is greatest toward the outer or right-hand end (as viewed in FIG. 3) of the shaft 58 since this is the end of the shaft which is displaced upwardly.

Resistance to compression of the sleeve 56 toward the inner or left-hand end of the bushing 52 causes the inner end of the shaft 58 to rock downward, as indicated by the arrow 76. This causes some compression of the sleeve 56 against the lower part of the bushing 52 toward the inner or left-hand end of the bushing 52. This rocking movement of the shaft 58 causes the valve element 62 to move into an open position away from the end of the discharge outlet 34, as shown in FIG. 3. This opens a clearance between the fitting 30 and the valve element 62 and permits the escape of powder, as shown in FIG. 4. By having the distance of the fitting 30 from the right-hand end of the bushing 52 greater, a larger clearance under the fitting 30 can be obtained for any given displacement of the right-hand end of the shaft 58 by the handle 66.

When pressure on the handle 66 is released, the compressed portions of the sleeve 56 at the top of the shaft 58 at the right of bushing 52 and at the bottom of the shaft 58 at the left of bushing 52, expand to their normal condition and restore the valve element 62 to its original closed position shown in FIGS. 1 and 2.

The opening 28 is closed by a plug 80 which seats against an O-ring gasket 82. This plug 80 can be removed for the purpose of inspecting the valve element 62 and for initially adjusting the valve element axially with respect to the powder discharge outlet 34. The axial adjustment of the valve element is maintained by means of a lock nut 84 which holds the bushing 52 in set position.

When the valve element 62 becomes worn by long repeated contacts with the end of the powder discharge outlet 34, a new working surface for the valve element can be obtained by rotating the valve element to bring a different portion of its circumference into contact with the powder discharge outlet 34. This rotation can be obtained by gripping the valve element tightly and turning it about its axis in the bushing 52, or by turning the bushing 52 in the opening through the wall of the housing. This latter method of adjustment affects the axial adjustment of the valve element, but the change in axial adjustment is very small for the amount of rotation that is necessary to bring a new arc of the circumference of the valve element into contact with the powder discharge outlet.

With the valve element 62 in closed position, the apparatus can be operated to feed powder by turning the fitting 30 in the top opening 22. Such a turning movement in a direction to unscrew the fitting from the valve housing 20 lifts the powder discharge outlet 34 from the valve element 62 and provides the clearance for powder similar to that shown in FIG. 4. The more the fitting 30 is rotated with respect to the housing 20, the larger the clearance becomes and the faster the powder flows.

FIG. 5 shows a fixed mark or indicator 88 on the top surface of the valve housing 20, and there are graduations 90 on the cylindrical surface of the fitting 30 for indicating how far the fitting 30 has been turned from the position in which the powder discharge outlet 34 touches the valve element and prevents powder flow.

The position at which no powder flows is indicated by the legend "OFF," and the other graduations by legends "1;" "2," "3," etc. The threads are coarse enough so that there is no occassion to ever turn the fitting 30 more than one revolution. A brake consisting of a rubber or other resilient plug 94 (FIG. 1) is pressed against the threads of the fitting 30 by a screw 96 screwed into a bore in one side of the housing 20 to provide friction for holding the fitting 30 in any set position corresponding to the various graduations 90.

The openings 42 are for the purpose of venting any pressure build-up that may occur in the powder passage as the result of a flashback or tip blockage when the powder valve is open. The screen in the opening is for preventing escape of powder.

The preferred embodiment of the invention has been illustrated and described, and the invention is defined in the appended claims.

What is claimed is:

1. A powder spray torch including a torch body through which gas is supplied to a burner tip, a housing carried by the torch body, a passage from which powder is supplied into the housing, said passage including a fitting through which a portion of the length of the passage extends to a discharge outlet of the fitting, an interference under the discharge outlet of the fitting for controlling the rate of powder discharge by gravity through the fitting, said interference comprising a cylindrical resilient compressible member adapted to be engaged and compressed by said fitting, and means for causing movement of the fitting toward and away from said member to regulate the rate of powder flow.

2. The powder spray torch described in claim 1 characterized by the fitting having threads by which it is connected with the housing, and the fitting being rotatable to screw it toward and from the interference.

3. The powder spray torch described in claim 1 characterized by adjacent faces of the fitting and the housing which are movable with respect to one another when the fitting and housing are moved relative to one another, a scale on one of the faces, and an indicator on the other face for cooperating with the scale to indicate the extent of the relative movement.

4. The powder spray torch described in claim 2 characterized by means for indicating the extent to which the fitting has been screwed up or down in the threads, said means including a scale and an indicator, one of which is on the fitting and the other of which is on the housing adjacent to the fitting.

5. The powder spray torch described in claim 1 characterized by a powder hopper on the housing, the fitting being connected to the discharge outlet of the hopper.

6. The powder spray torch described in claim 5 characterized by the hopper being integrally connected with the fitting for rotating the fitting by turning the hopper.

7. The powder spray torch described in claim 6 characterized by a brake that resists rotation of the fitting for holding the fitting in any position to which it is adjusted by rotation of the hopper.

8. The powder spray torch described in claim 7 characterized by means for adjusting the friction of the brake.

9. The powder spray torch described in claim 1 characterized by the interference being a valve element in the body of the torch housing, said valve element having a top surface for contact with the discharge outlet, said top surface sloping downward on both sides of a mid region, and manually operating means for moving the valve element toward and from the outlet of the fitting.

10. The powder spray torch described in claim 1 characterized by the interference being an element having a soft face for contact with the fitting, and a bearing on which the interference is rotatable to bring different surfaces of the interference into position for contact with the fitting.

11. The powder spray torch described in claim 1 characterized by the torch having an aspirator through which gas flows on its way to a tip of the torch, the housing enclosing a chamber which communicates with the aspirator for flow of gas from the chamber to the aspirator, the interference being located in the housing and comprising a valve element which closes the discharge outlet, the valve element having a portion which extends through a wall of the housing for operation by an actuator outside of the housing, a fitting at the lower end of the hopper and connected with the hopper, the fitting having screw threads which screw into complementary threads in an opening through the top of the housing immediately above the valve element, the discharge outlet being connected to the lower end of the fitting and being moved toward and away from the valve element by rotating the fitting and the hopper so that the fitting moves along screw threads of the opening, the width of the discharge outlet being correlated with the width of the valve element so as to leave space for flow of powder by gravity around the sides of the valve element when the discharge outlet is moved away from the valve element, the outside surface of the fitting having a portion adjacent to a top surface of the housing, one of the surfaces having indicia thereon and the other surface having an indicator for showing the position of the fitting and discharge outlet with respect to the valve element.

12. A powder spray torch including a valve housing extending upwardly from a top side of the torch, a lower passage in the bottom of the valve housing and through which powder is introduced into the interior of the torch, a valve element in the housing above the lower passage and movable between closed and open positions, an upper passage above the valve element and through which powder flows into the valve housing, the upper passage being in substantial alignment with the lower passage for free flow by gravity of powder from the upper passage to the lower passage when the valve element is in position to permit flow, and means for adjusting the rate of gravity flow from the upper passage through the housing to the lower passage, said means including a rotatable element extending outside of the valve housing and threaded into said upper passage.

References Cited
UNITED STATES PATENTS
1,825,431   9/1931   Tsagaris _____ 222—46

FOREIGN PATENTS
816,193   7/1959   Great Britain.

ROBERT B. REEVES, Primary Examiner

H. S. LANE, Assistant Examiner

U.S. Cl. X.R.

222—163, 193, 482, 517, 545